US007954787B2

(12) United States Patent
Ricco et al.

(10) Patent No.: US 7,954,787 B2
(45) Date of Patent: Jun. 7, 2011

(54) FUEL INJECTOR WITH BALANCED METERING SERVOVALVE, FOR AN INTERNAL COMBUSTION ENGINE

(75) Inventors: Mario Ricco, Casamassima (IT); Raffaele Ricco, Valenzano (IT); Antonio Gravina, Valenzano (IT); Marcello Gargano, Valenzano (IT); Sergio Stucchi, Valenzano (IT); Onofrio De Michele, Valenzano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 683 days.

(21) Appl. No.: 12/021,531

(22) Filed: Jan. 29, 2008

(65) Prior Publication Data

US 2008/0257989 A1 Oct. 23, 2008

(30) Foreign Application Priority Data

Apr. 23, 2007 (EP) .................................... 07425242

(51) Int. Cl.
*F16K 31/02* (2006.01)

(52) U.S. Cl. ................................ 251/129.16; 239/585.1

(58) Field of Classification Search ............. 251/129.06, 251/129.16; 239/92, 584, 585.1
See application file for complete search history.

(56) References Cited

U.S. PATENT DOCUMENTS

| | | | | |
|---|---|---|---|---|
| 6,305,355 | B1 * | 10/2001 | Hoffmann et al. | 123/467 |
| 6,619,617 | B2 * | 9/2003 | Ricco et al. | 251/129.16 |
| 6,899,069 | B2 * | 5/2005 | Mattes et al. | 123/90.12 |
| 7,299,998 | B2 * | 11/2007 | Ricco et al. | 239/96 |
| 7,458,529 | B2 * | 12/2008 | Ricco et al. | 239/585.3 |
| 7,513,445 | B2 * | 4/2009 | Ricco et al. | 239/585.3 |
| 7,793,862 | B2 * | 9/2010 | Ricco et al. | 239/96 |

FOREIGN PATENT DOCUMENTS

| | | |
|---|---|---|
| EP | 1 612 403 A1 | 6/2004 |
| EP | 1 621 764 A1 | 5/2005 |
| EP | 1 731 752 A1 | 5/2006 |

* cited by examiner

*Primary Examiner* — John K Fristoe, Jr.
(74) *Attorney, Agent, or Firm* — Berenato & White, LLC

(57) ABSTRACT

The injector comprises a balanced metering servovalve to control a rod for the opening/closing of a nozzle. La servovalve has a valve body with a control chamber radially delimited by a tubular portion and fitted with an outlet passage that is opened/closed by an axially movable shutter. The servovalve is also integral with an axial stem, provided with a lateral surface, through which the outlet channel exits. The shutter is coupled to the stem in an axially sliding manner and, when it closes the outlet passage, it is subjected to substantially null axial fuel pressure. The outlet passage has a calibrated segment distanced from the shutter and close to a bottom wall of the control chamber. The calibrated segment is carried by an element fixed to the valve body in correspondence to an axial segment of the outlet passage.

17 Claims, 5 Drawing Sheets

FUEL INJECTOR WITH BALANCED METERING SERVOVALVE, FOR AN INTERNAL COMBUSTION ENGINE

The present invention concerns a fuel injector with balanced metering servovalve, for an internal combustion engine, in which the servovalve controls a control rod for the opening/closing of an injection nozzle.

BACKGROUND OF THE INVENTION

Normally, the metering servovalve comprises a control chamber having a calibrated, pressurized fuel inlet hole. The control chamber is axially delimited by an end wall of the control rod on one side, and by the wall of the chamber on the other, fitted with an outlet or discharge hole. This outlet hole has a calibrated section and is opened/closed by a shutter to vary the pressure in the control chamber with a predetermined gradient. In particular, the shutter is axially movable under the action of an actuator and the axial thrust of a spring.

Injectors with a balanced-type metering servovalve have already been proposed, in which the shutter is subjected to substantially null axial pressure effects in the closed position, for which both the spring preloading and the actuator force can be reduced. In a known injector with balanced metering servovalve, the body of the valve is coupled with another body comprising an axial guide for the actuator anchor, through an intermediate element carrying an outlet hole with calibrated section, which communicates with a discharge passage carried by said other body. The discharge passage comprises an axial segment and a radial segment that exits through a lateral surface of the guide. In particular, the shutter is formed by a sleeve integral with the anchor and engaging in a fluid-tight manner with the axial guide, so as to obtain large fuel passage sections, without shutter rebound phenomena at the end of opening and closing travel.

This servovalve, although being satisfactory from the viewpoint of balancing pressure on the shutter, has the drawback of requiring three different parts to delimit the control chamber and to guide the anchor. Variations in the opening/closing behaviour of the injection nozzle with respect to that planned can be provoked due to the various couplings of these three parts and the flow conditions inside the injector at high fuel pressures.

An injector has also been proposed in which the valve body is in one piece with a shutter guide stem and carries an outlet passage comprising an axial segment and a radial segment. The latter has an accurately calibrated section and is opened and closed by the shutter, for which the servovalve is still of the "balanced" type.

This injector has a drawback due to the fact that the axial segment of outlet passage increases the volume of the control chamber. In order to achieve acceptable reactivity from the servovalve, it is necessary to reduce the diameter of the axial segment. Since the axial segment always has a very long length compared to the diameter, the drill bit needed to make it tends to flex, with high probability of breaking before arriving at the hole of the radial segment, which is why making it is difficult.

Furthermore, as it is necessary that the diameter of this axial segment is as small as possible, it follows that during the manufacture of the valve body, solid particles, such as machining chips for example, can remain trapped inside the blind part of the channel's axial segment. These solid particles, by having dimensions similar to those of the radial calibrated restriction, can even block it, endangering correct operation of the injector. Even a washing operation, with a liquid under high pressure for example, could be insufficient to remove these solid particles.

Since the calibrated section segment of the channel or restriction is radial, it must run onto a cylindrical surface and must match with the axial segment on the inside. Manufacturing of the valve body is therefore difficult and generates inaccuracies and a high reject percentage. In any case, due to the change in flow direction close to the calibrated section segment, disturbances are created in the fuel flow in output, which reduces reactivity.

Finally, due to the high pressure gradient that becomes established in correspondence to the calibrated restriction when the shutter is opened, vapour is formed immediately downstream of the same calibrated restriction. As this calibrated restriction is positioned close to the sealing surface of the shutter on the valve body, cavitation phenomena can arise that damage the sealing seat. In any case, the absence of fuel in the liquid phase in the zone of cavitation results in contact between the shutter and its seat without any form of damping. Both phenomena cause erosion and enormously shorten the life of the servovalve.

SUMMARY OF THE INVENTION

The object of the invention is that of embodying a fuel injector with a balanced servovalve for an internal combustion engine, which allows high servovalve reactivity to be achieved, eliminating the above-stated drawbacks in a simple and economic manner.

This object of the invention is achieved by a fuel injector with a balanced metering servovalve, for an internal combustion engine, as defined in the attached claims.

BRIEF DESCRIPTION OF THE DRAWINGS

For a better understanding of the invention, some preferred embodiments will now be described, purely by way of non-limitative examples, with the aid of the attached drawings, in which.

DETAILED DESCRIPTION OF THE INVENTION

Figure 1:
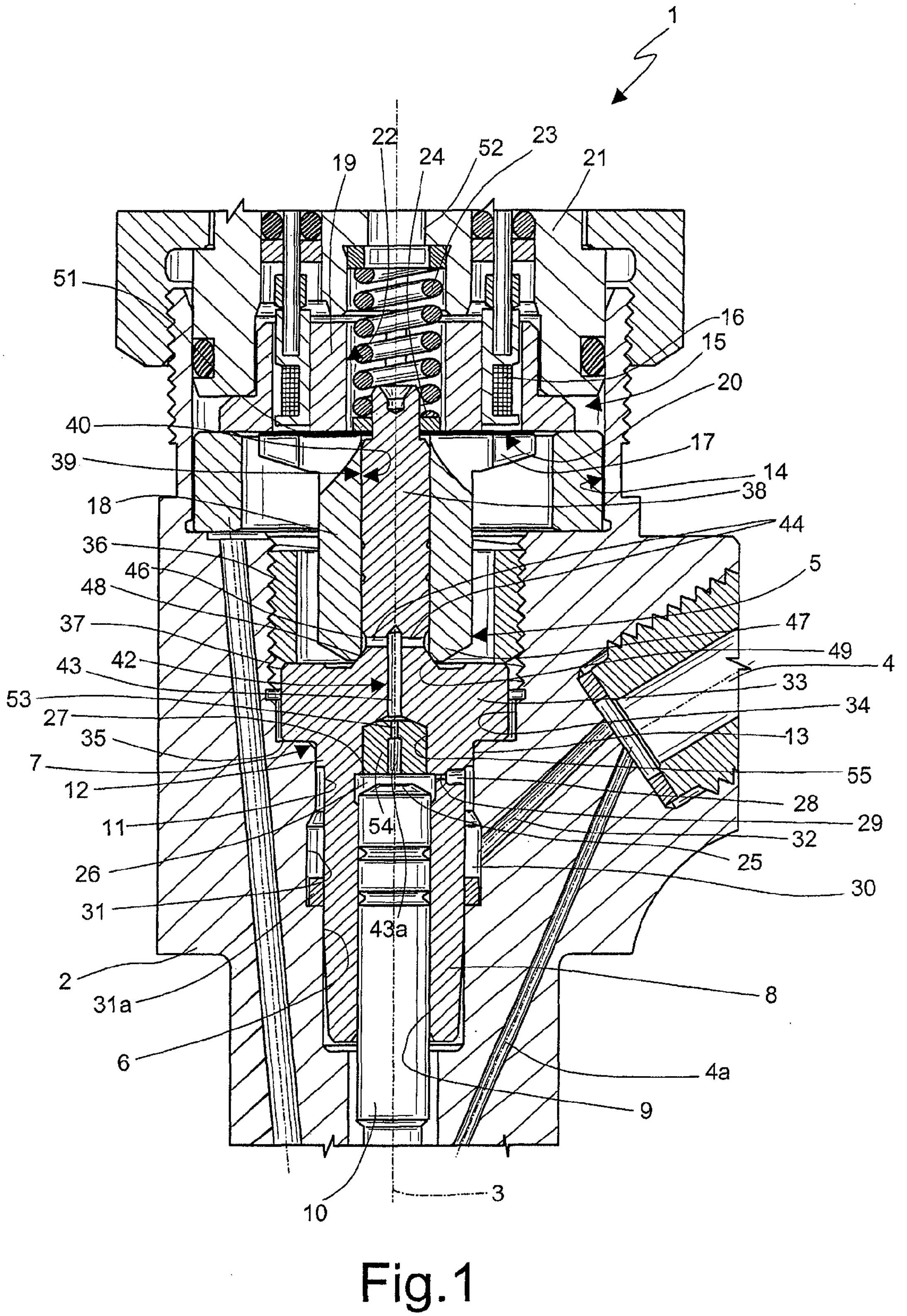
FIG. 1 shows a partial vertical section of a fuel injector with a balanced servovalve, for an internal combustion engine, according to a first preferred embodiment of the invention.

With reference to FIG. 1, numeral 1 indicates, as a whole, a fuel injector (partially shown) for an internal combustion engine, in particular with a diesel cycle. The injector 1 comprises a hollow body or casing 2, commonly known as the "injector body", which extends along a longitudinal axis 3 and has a lateral inlet 4 suitable for connection to a high-pressure fuel supply line, at a pressure of around 1800 bar for example. The casing 2 ends with an injection nozzle (not shown in the figure), which is in communication with the inlet 4 through a channel 4_a_, and is able to inject fuel into the associated engine cylinder.

The casing 2 defines an axial cavity 6 in which a metering servovalve 5 is housed, comprising a valve body, indicated by reference numeral 7. The valve body 7 is in one piece with a tubular portion 8 that defines an axial hole 9, in which an injection control rod 10 can slide axially, sealed against pressurized fuel. The portion 8 has a cylindrical outer surface 11, from which a centering ridge 12 extends, coupled to an inner surface 13 of the body 2. The rod 10 is axially movable in the hole 9 to control, in the known manner, a shutter needle (not shown) that opens and closes the injection nozzle.

The casing 2 is fitted with another cavity 14, coaxial with cavity 6 and housing an actuator 15, comprising an electromagnet 16 able to operate a notched-disc anchor 17, which is integral with an axial sleeve 18. In particular, the electromagnet 16 comprises a magnetic core 19 that has a stop surface 20 for the anchor 17, perpendicular to the axis 3, and held in position by a support 21.

The actuator 15 has an axial cavity 22, in which a coil compression spring 23 is housed, preloaded to exert thrust on the anchor 17 in the opposite direction to the attraction exerted by the electromagnet 16. In particular, the spring 23 has one end resting against an internal shoulder of the support 21, and the other end acting on the anchor 17 through a washer 24.

The valve body 7 comprises a metering control chamber 26, which contains the volume delimited radially by the lateral surface of the hole 9 of the tubular portion 8, and axially by an end surface 25 of the rod 10 and by a bottom wall (or surface) 27 of the hole 9 itself. The control chamber 26 is in permanent communication with the inlet 4, through an inlet channel 28 made in portion 8, to receive pressurized fuel. The channel 28 is provided with a calibrated segment 29 that runs to the control chamber 26 in proximity to the bottom wall 27, for which the end surface 25 usefully has a truncated-cone shape. Instead, the inlet channel 28 runs to the outside, to an annular chamber 30, radially delimited by the surface 11 of portion 8 and by an annular groove 31 in the inner surface of the cavity 6. The annular chamber 30 is axially delimited on one side by the ridge 12 and on the other by a gasket 31_a_. Finally, a channel 32 made in the body 2 and in communication with the inlet 4 runs to the annular chamber 30.

Henceforth, the term "calibrated" applied to hole, channel, passage, segment or a restriction of these, is intended as indicating a diameter or a section and a length made with extreme precision, to exactly define a predetermined fluid flow rate with a given pressure difference between the associated inlet and the associated outlet. In particular, a so-called "calibrated" hole or restriction is subjected to precisely the operation of "calibration", consisting in measuring the flow rate of a given fluid that passes through it when a predetermined pressure difference is applied between its upstream and downstream points.

The valve body 7 also comprises an intermediate axial portion, integral with the tubular portion 8, which forms an external flange 33, projecting radially with respect to the ridge 12, and housed in a portion 34 of the cavity 6 with enlarged diameter. The flange 33 is arranged axially in contact with a shoulder 35 inside the cavity 6, against which a threaded ring nut 36 is tightened, screwed into an internal thread 37 of portion 34, in order to guarantee fluid-tight sealing against the shoulder 35.

The valve body 7 also comprises a guide element for the anchor 17, composed of a stem 38 having a much smaller diameter than that of the flange 33. The stem 38 projects beyond the flange 33 itself, along the axis 3 in the opposite direction to the tubular portion 8, namely towards the cavity 22. The stem 38 is externally delimited by a lateral cylindrical surface 39 that guides the axial sliding of the sleeve 18. In particular, the sleeve 18 has an internal cylindrical surface 40, coupled to the lateral surface 39 of the stem 38 that is substantially fluid-tight, or rather via a coupling with opportune diameter play, 4 micron for example, or via the insertion of specific sealing elements.

Figures 2, 3, 4:
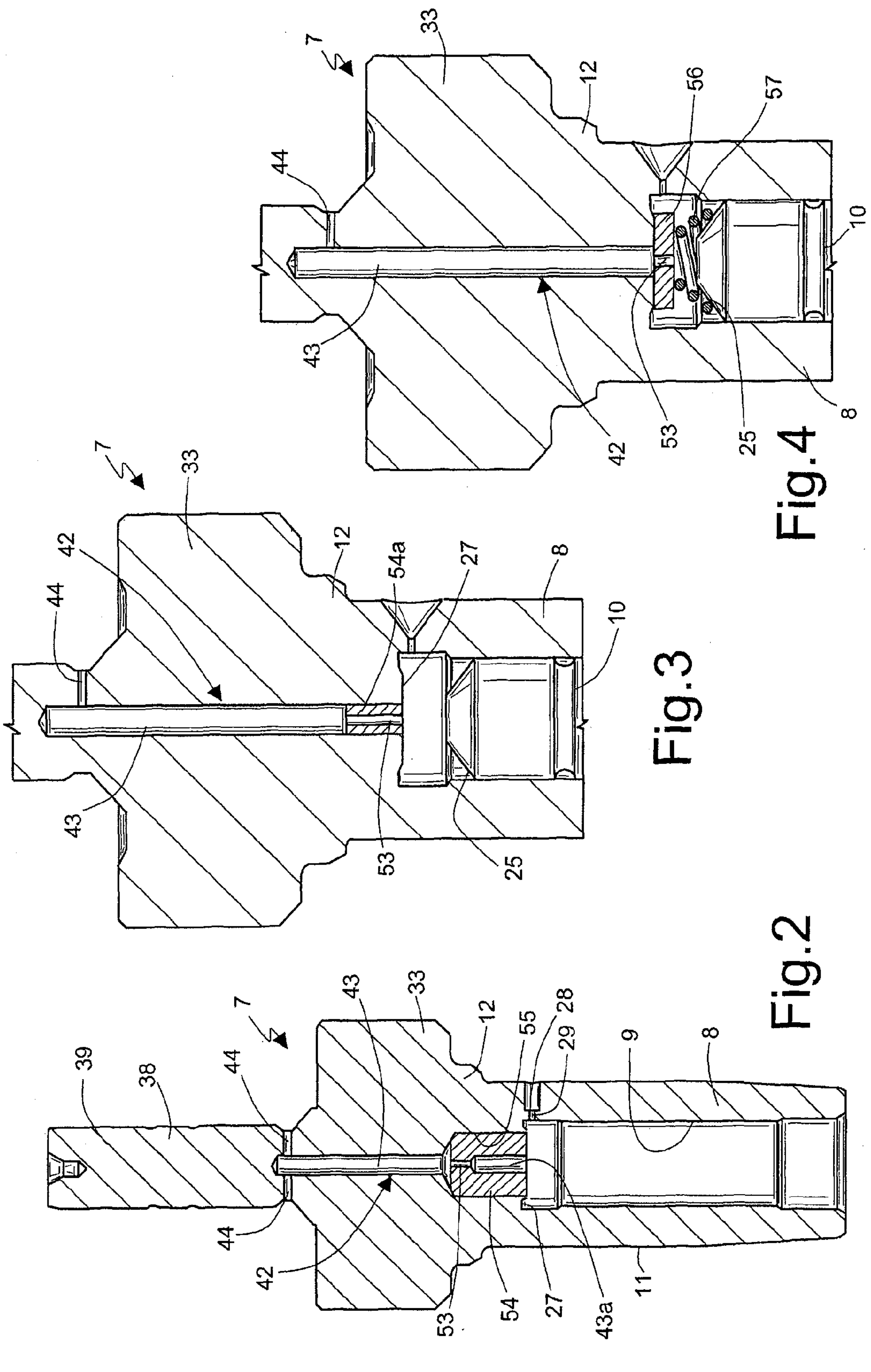
FIG. 2 shows a detail of FIG. 1 on a larger scale.
FIG. 3 shows part of the detail in FIG. 2 on an even larger scale, according to a first alternative of the embodiment of FIG. 1.
FIG. 4 shows the detail in FIG. 3 according to another alternative of the embodiment of FIG. 1, FIG. 5 schematically shows the detail in FIG. 3 according to another embodiment of the invention.

The control chamber 26 also has a fuel outlet or discharge passage, indicated as a whole by reference numeral 42 and made entirely within the valve body 7. The passage 42 comprises a blind axial segment 43, made along the axis 3, partly in the flange 33 and partly in the stem 38. The passage 42 also comprises at least one radial segment 44 in communication with the axial segment 43. In the alternative of FIGS. 1 and 2, two radial segments 44 are provided that run to an annular chamber 46 formed by a groove in the lateral surface 40 of the stem 38.

The annular chamber 46 is obtained in an axial position adjacent to the flange 33 and is opened/closed by an end portion of the sleeve 18, which forms a shutter 47 for the outlet passage 42. The shutter 47 ends with a truncated-cone inner surface 48, which is able to engage a truncated-cone connecting surface 49 between the flange 33 and the stem 38.

In particular, the sleeve 18 is able to slide on the stem 38, together with the anchor 17, between an advanced end stop position and a retracted end stop position. In the advanced end stop position, the shutter 47 closes the annular chamber 46 and therefore also the outlet of the radial segment 44 of the passage 42. In the retracted end stop position, the shutter 47 sufficiently opens the annular chamber 46 to allow the radial segments 44 to discharge fuel from the control chamber 26, the outlet passage 42 and the annular chamber 46.

The advanced end stop position of the sleeve 18 is defined by the surface 48 of the shutter 47 hitting against the truncated-cone connection surface 49 between the intermediate portion 33 and the stem 38. Instead, the retracted end stop position of the sleeve 18 is defined by the anchor 17 axially hitting against the surface 20 of the core 19, with a nonmagnetic gap sheet 51 inserted in between. In the retracted end stop position, the anchor 17 places the annular chamber 46 in communication with a discharge channel of the injector (not shown), via an annular passage between the ring nut 36 and the sleeve 18, the notches in the anchor 17, the cavity 22 and an opening 52 on the support 21.

When the electromagnet 16 is energized, the anchor 17 moves towards the core 19, together with the sleeve 18, and hence the shutter 47 opens the annular chamber 46. The fuel is then discharged from the control chamber 26, the channel 42 and the annular chamber 46 itself. In this way, the fuel pressure in the control chamber 26 drops, causing an upward axial movement of the rod 10 and thus the opening of the injection nozzle.

Conversely, on de-energizing the electromagnet 16, the spring 23 returns the anchor 17, together with the shutter 47, to the advanced end stop position in FIG. 1. In this way, the annular chamber 46 is closed again and the pressurized fuel entering from the channel 28 re-establishes high pressure in the control chamber 26, resulting in the rod 10 returning downwards and closing the injection nozzle. In the advanced end stop position, the fuel exerts a substantially null axial thrust resultant on the sleeve 18, as the pressure in the annular chamber 46 only acts radially on the lateral surface 39 of the sleeve 18 itself.

In order to control the velocity of pressure variation in the control chamber 26 on the opening and closing the shutter 47, the outlet passage 42 is fitted with a restriction or calibrated segment, generically indicated with reference numeral 53. As a rule, this calibrated segment 53 has a diameter between 150 and 300 micron. Instead, for technological reasons, the axial segment 43 of the passage 42 is at least five times the diameter of the calibrated segment 53.

According to the invention, in order to make the metering servovalve 5 more reactive, the calibrated segment 53 is arranged in the outlet passage 42 away from the annular chamber 46 and hence the shutter 47, and substantially close to the bottom wall 27 of the hole 9. In this way, the volume of fuel for which the pressure variation must be controlled is significantly reduced, being represented by just the volume of the hole 9 between the bottom wall 27 and the surface 25 of the rod 10, and by the possible portion of the passage 42 upstream of the calibrated segment 53.

Instead, the fuel volume of the passage 42 downstream of the calibrated segment 53, which can even be greater than the said volume of the hole 9, does not substantially affect the pressure variation in the control chamber 26. The axial segment 43 can usefully have a diameter at least eight times that of the calibrated segment 53. For technical reasons, the calibrated segment 53 is preferable arranged in a separate element of the valve body 7 and subsequently fixed in correspondence to the bottom wall 27 of the hole 9.

According to the alternative in FIGS. 1 and 2, the calibrated segment 53 is arranged in a cylindrical bushing 54 made of a very hard material. The calibrated segment 53 can be obtained with great precision, for example, by initial machining carried out via electron discharge or laser and then with the effective calibration achieved via hydro-erosion. The calibrated segment 53 is only limited to part of the axial length of the bushing 54, while a segment 43*a* with a diameter substantially smaller or equal to that of the axial segment 43 of the valve body 7 can be made along the remaining length of bushing 54.

The bushing 54 has an external diameter such as to allow insertion by force, or rather interference fitting, into a seat 55 at the end of the axial segment 43 of the passage 42, in order to arrange it flush with the bottom wall 27 of the hole 9. Depending on the optimal volume required for the control chamber 26, the calibrated segment 53 can be arranged at the upper end of the bushing 54 as in FIGS. 1 and 2, or at the end of the bushing 54 flush with the wall 27, as in the alternatives in FIGS. 7 and 8. According to a alternative not shown, the segment 53 can also be arranged in an intermediate position along the bushing 54.

In any case, both the axial segment 43 and the radial segment 44 of the passage 42 are obtained in the valve body 7 via normal drill bits, without special precision. Instead, the calibrated segment 53 of the bushing 54 is made with high precision and the bushing 54 is subsequently implanted at the end of the axial segment 43, in any known manner.

According to the alternative in FIG. 3, only one radial segment 44 is provided, which has a section substantially equal to the sum of the sections of the two radial segments 44 in FIG. 2. Furthermore, the calibrated segment 53 is obtained in a bushing 54*a* over its entire length. The bushing 54*a* has an external diameter corresponding to that of the axial segment 43, and in fixed in this segment 43 so that its lower surface is flush with the bottom wall 27 of the hole 9. In this way, the volume of the control chamber 26 is reduced to the zone included between the end surface 25 of the rod 10 and the bottom wall 27 of the hole 9.

According to the alternative in FIG. 4, the calibrated segment 53 is provided on a plate 56 made of a suitable material to allow the drilling of the calibrated segment 53 with high precision. Since the travel of the rod 10 to open and close the nozzle of the injector 1 is always very small, the plate 56 can be kept in contact with the bottom surface 27 via a compression spring 57.

As the end surface 25 of the rod 10 has a truncated-cone shape, the plate 56 can also have a considerably smaller diameter than that of the hole 9, as shown in FIG. 4, while the spring 57 can have a truncated-cone shape in order to keep the plate 56 centred. According to a alternative not shown, the hole 9 can include an end portion with a diameter corresponding to the external diameter of the plate 56, which can then be inserted by force into this end portion.

Figure 6:
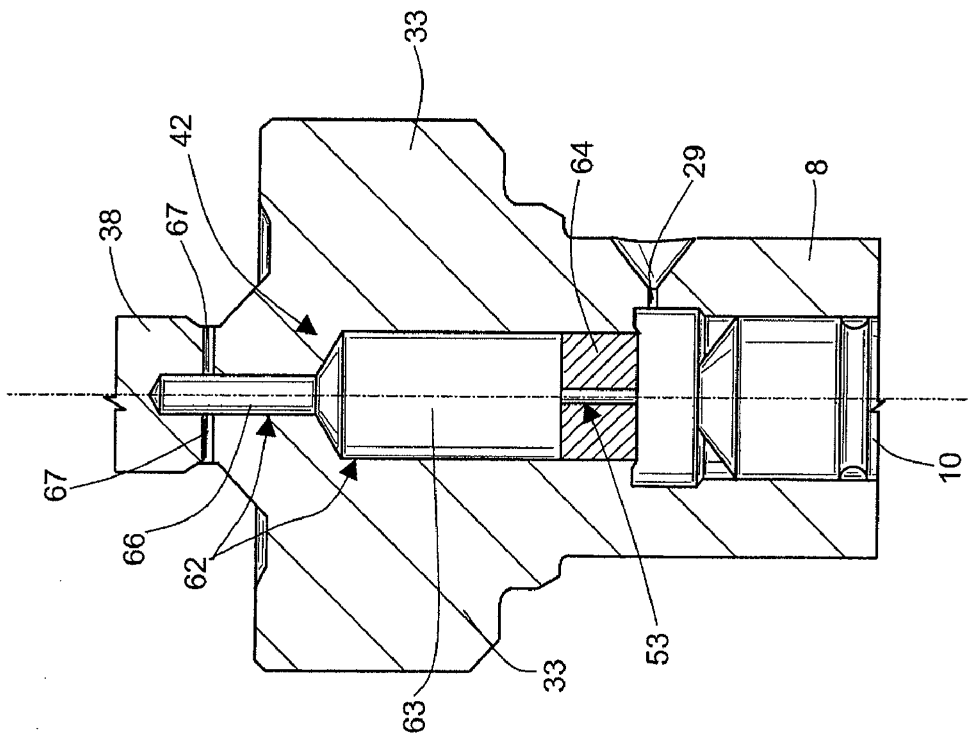
FIG. 6 shows the detail in FIG. 5 according to a alternative of the associated embodiment.
Figure 5:
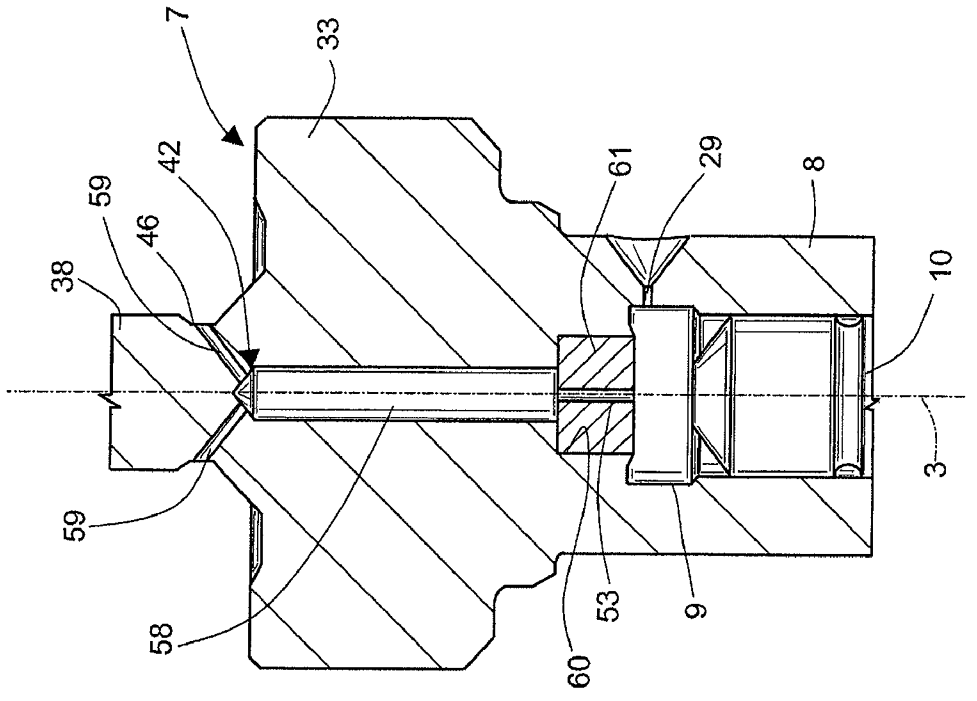

According to the embodiments in FIGS. 5 and 6, as the volume of the control chamber is limited to just the volume enclosed by the axial hole 9, the axial segment of the outlet passage 42 can assume a significantly larger diameter than that of each radial segment, facilitating manufacturing.

According to the alternative in FIG. 5, the outlet channel 42 comprises an axial segment 58 obtained substantially just in the flange 33 of the valve body 7, which has a considerable diameter. Furthermore, the outlet passage 42 comprises two substantially radial segments 59, which are inclined by a certain angle with respect to the axis 3 in order to place the annular chamber 46 in direct communication with the axial segment 58. In this way, the diameter of the stem 38 can be significantly reduced and consequently also the diameter of the fluid sealing ring with the sleeve 18.

In turn, the calibrated segment 53 is obtained in a bushing 61 of shorter length than that of the segment 58. The calibrated segment 53 extends for the entire length of the bushing 61, for which its manufacture becomes simpler. The bushing 61 is driven, or rather inserted by force, into a seat 60 having a diameter specially enlarged with respect to that of the axial segment 58 to facilitate this press fitting. The axial segment 58 can usefully have a diameter between 8 and 20 times that of the calibrated segment 53. In this way, when making the holes, the intersection of the same holes 59 with the end part of segment 58 is facilitated.

Furthermore, the radial segments 59 can be inclined with respect to the axis 3 by an angle between 30° and 45°. In this way, the length of the segment 58 is significantly reduced, and its manufacture and cleaning are facilitated. In addition, by ensuring that the end part of segment 58 is included in the external flange 33 of the valve body 7, the stem 38 has greater structural strength, the diameter of which can now even be reduced, with obvious benefits in limiting leaks in the pin/shutter dynamic seal.

According to the alternative in FIG. 6, the outlet passage 42 comprises an axial segment 62 having a portion 63 of relatively larger diameter and obtained entirely within the flange 33 of the valve body 7. A corresponding bushing 64, carrying the calibrated segment 53 extended over the entire length of the bushing 64 itself, is inserted in the portion 63 by force. The axial segment 62 extends beyond the flange 33 into the stem 38 with a portion 66 of reduced diameter, so as to allow the diameter of the stem 38 to be reduced and thus the diameter of the seal with the sleeve 18. The diameter of the portion 66 can usefully be between two and five times the diameter of the calibrated segment 63.

The outlet passage 42 of the alternative in FIG. 6 comprises two diametrically opposed radial segments 67, perpendicular to the axis 3. The portion 66 of axial segment 62 extends into the stem 38 so as to allow the outflow of two radial holes 67. In this case, therefore, having reduced the length of the small-diameter axial segment 66, the risk that the drilling bit can flex and break when making the axial hole 62 is reduced.

Figure 8:
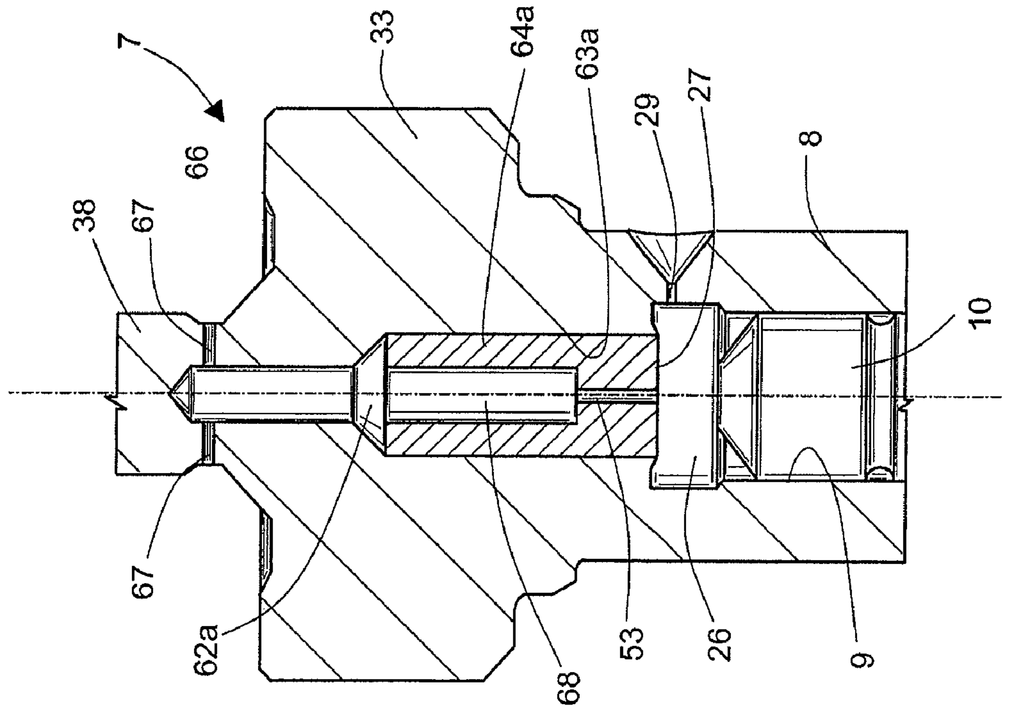
FIGS. 7 and 8 show two alternatives of the detail in FIGS. 5 and 6 respectively.
Figure 7:
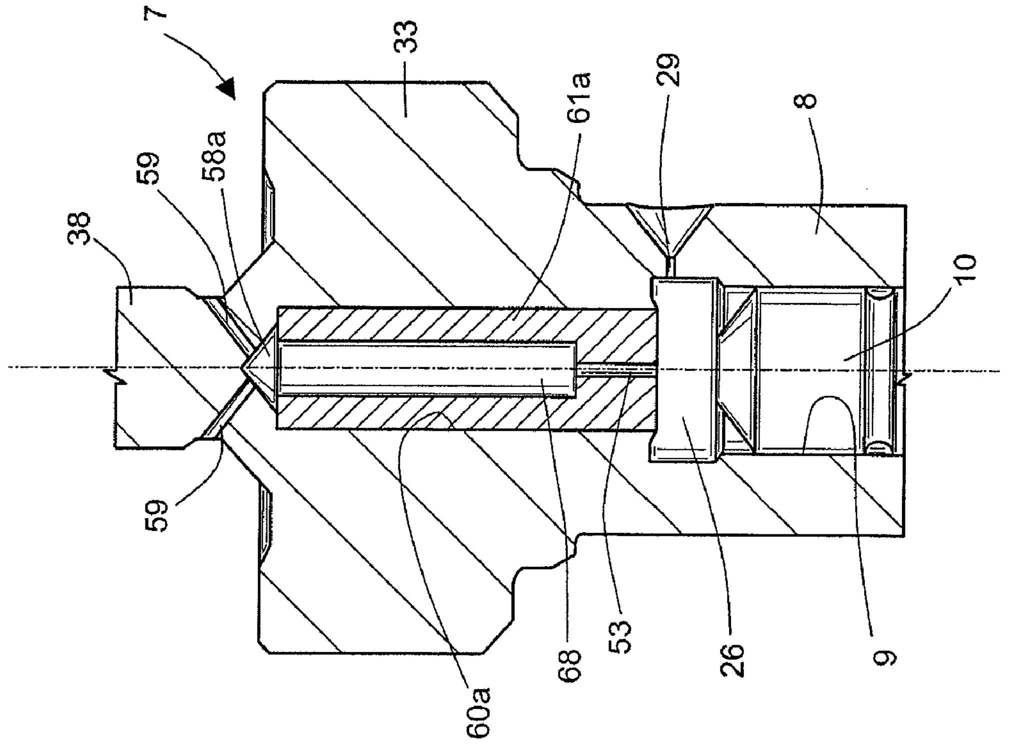
Figure 9:
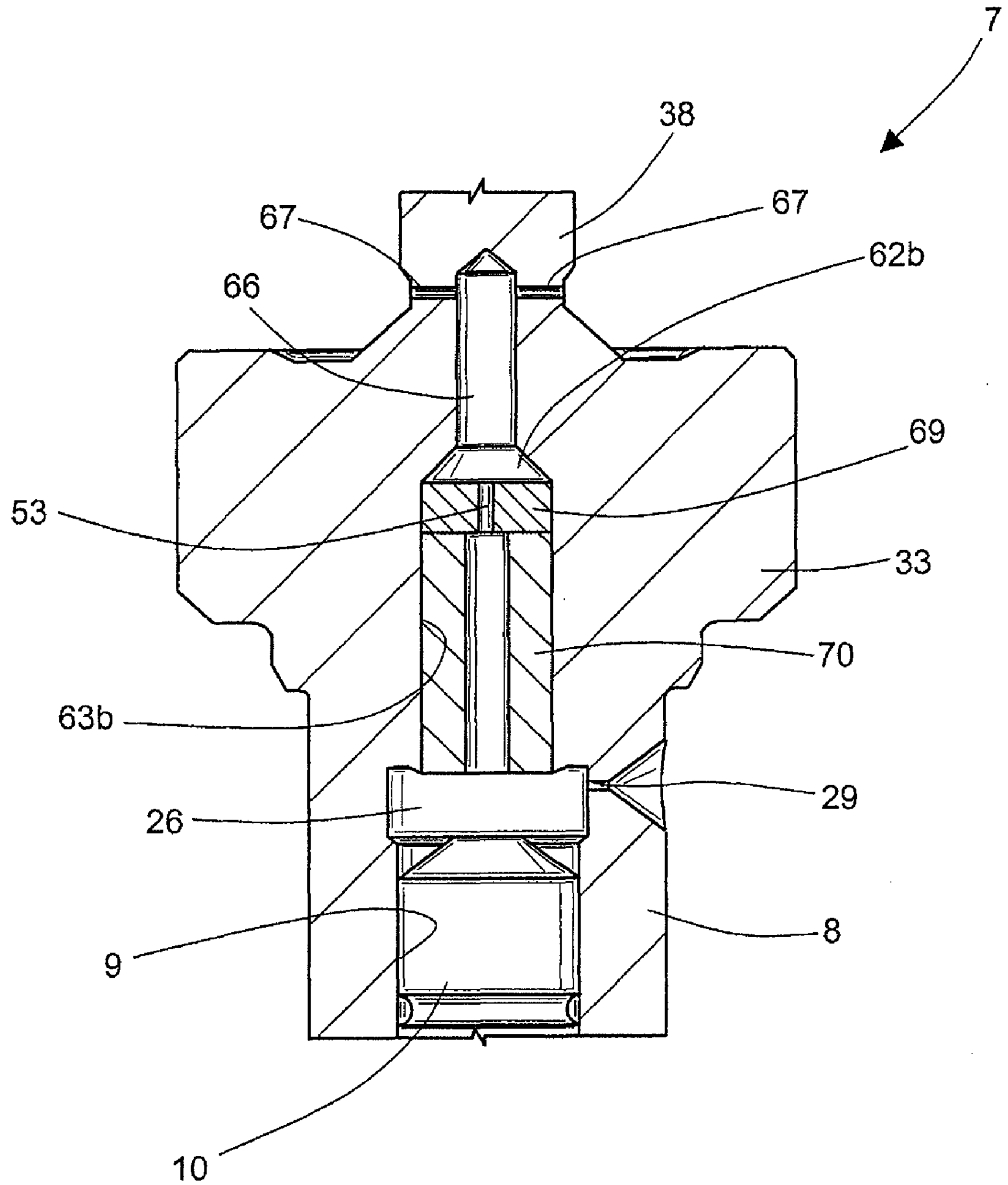
FIG. 9 shows the detail in FIG. 5 according to another alternative of the associated embodiment.

In the alternatives in FIGS. 7-9, the parts that are the same as those in FIGS. 5 and 6 are indicated with the same reference numeral, whilst similar but not identical parts are indicated with the same reference numeral as FIGS. 5 and 6, together with a suffix letter of a or b. Therefore, the description of the alternatives in FIGS. 7-9 is limited to just the parts that are similar, but not the same.

The alternatives in FIGS. 7 and 8 differ from those in FIGS. 5 and 6 in that the respective calibrated segment 53 is obtained in a corresponding bushing 61*a* and 64*a*, but only extends to a small part of the length of the bushing 61*a* and 64*a*. As already mentioned, the calibrated segment 53 is arranged adjacent to the wall 27 of the hole 9 and hence the volume of the control chamber 26 is also reduced to that enclosed by the hole 9. Whereas in the remaining part of the bushing 61*a* and 64*a*, a hole 68 of much larger diameter is obtained, which allows the volume downstream of the calibrated segment 53 to be increased without requiring special machining precision.

In particular, in the alternative in FIG. 7 the bushing 61*a* and associated seat 60*a* substantially extend for the entire length of the axial segment 58*a*, and thus for the entire thickness of the flange 33. Instead, in the alternative in FIG. 8, the bushing 64*a* extends for the entire length of the respective portion 63*a* of the axial segment 62*a* of the passage 42. In both cases, the bushing 61*a* and 64*a* is respectively driven by force into the seat 60*a* and into the portion 63*a*, until it stops against a narrowing of the axial segment 58*a* and 62*a*.

The alternative in FIG. 9 differs from that in FIG. 8 due to the fact that the calibrated segment 53 is made in a thin plate 69 made of a relatively hard material. This plate 69 is not inserted in the portion 63*b* of the coaxial segment 62*b* by force, but is provided with a certain amount of play with respect to it.

Instead, mounting of the plate 69 is achieved via an insert formed by a sleeve 70, made of a relatively soft material to facilitate its press fitting. In fact, the valve body 7 is normally heat-treated to confer it with very high hardness; enough to reduce wear due to contact with the movable elements (control rod 10 and shutter 47).

Nevertheless, the plate 69 carrying the calibrated segment 53 must also be made of a very hard material, in order to resist wear phenomena caused by cavitation or erosion. As the press fitting of the plate 70 in a hard material into a seat of a very hard material can prove difficult to accomplish, it is useful to constrain the plate 69 carrying the calibrated segment 53 via the sleeve 70, made of a softer material and hence easy to press fit.

From what has been seen above, the advantages of the injector according to the invention with respect to injectors of known art are evident. First of all, even when the valve body 7, comprising both the tubular portion 8 and the guide stem 38 of the anchor 17, is obtained in a single piece, the calibrated segment 53, positioned away from the shutter 47 and close to the bottom wall 27 of the hole 9, allows the volume of the control chamber 26 to be reduced and improves the reactivity of the servovalve 5.

Having moved the calibrated segment 53 away from the truncated-cone surface 49 of the valve body 7, on which the sealing of the shutter 47 takes place, the risk of the sealing zone being subjected to cavitation wear phenomena is significantly reduced. In fact, as the diameter of this coaxial segment is much larger than that of the calibrated segment 53, the vapour formed immediately downstream of the calibrated segment 53 in the coaxial segment of the passage 42 is transformed back to the liquid phase again under the effect of expansion due to the increase in passage section.

Furthermore, it is possible to obtain both the axial segment and the radial segments of the outlet passage 42 via normal precision drilling. The calibrated segment 53 obtained in a bushing or a plate to be subsequently inserted in the specially provided seat allows a superior material, more suited to maximum precision machining, to be used. Alternatively, the calibrated segment 53 can be made in the bushing or plate using cheaper technologies, such as laser technology for example. Moreover, the abrasive calibration operation that, as already stated, consists in making a predefined flow rate of an abrasive fluid pass through this segment 53 to improve the velocity coefficient, is very simple and therefore of low cost.

Having increased the size of the diameter of the axial segment of the outlet passage 42, it is much easier to clean out chips during the various manufacturing phases. Since the press fitting of the element carrying the calibrated segment 53 is the last operation to be performed, the presence of particles that could jeopardize operation of the injector is avoided.

Finally, the alternatives in FIGS. 5-9 allow the diameter of the stem 38 to be reduced and hence also the diameter of the fuel sealing ring on the sleeve 18. In this way, leaks from the dynamic seal defined by the shutter 47 and the stem 38 are significantly reduced. In particular, the diameter of the stem 38 can be reduced to a value between 2.5 and 3.5 mm, according to the material chosen for the valve body, the heat treatment to which the valve body is subjected and, consequently, its toughness, and lastly, the manufacturing cycle adopted.

The reduction of the seal diameter on the shutter 47 also allows the axial length of the sleeve 18 to be reduced.

In fact, the flow rate of fluid leakage is directly proportional to the circumference of the coupling zone between the inner cylindrical surface of the sleeve 18 and the outer cylindrical surface 39 of the stem 38, but inversely proportional to the axial length of this coupling zone: as the circumference of the coupling zone has decreased, for the same fluid leakage flow rate it is possible to reduce the axial length of the coupling zone and, consequently, the axial length of the sleeve 18.

The reduction of the seal diameter and, in consequence, the external diameter of the shutter 47 and the reduction in length of the sleeve 18 have the effect of reducing the mass of the sleeve 18 and, consequently, the response times of the metering servovalve 5.

Furthermore, the reduction in the seal diameter allows the load of the spring 23 to be reduced: in fact, for the same coupling play between the stem 38 and the shutter 47, the circumference of the seal between the stem 38 and the shutter 47 decreases and, consequently, also the axial force that acts on the shutter 47 due to the fuel pressure, which although minimal, is still present even if the metering servovalve is of the balanced tape. The ratio between the preloading of the spring 23 and the seal diameter or diameter of the coupling zone is usefully between 8 and 12 [N/mm].

The reduction in mass of the sleeve 18 and the reduction in load of the spring 23 have the effect of much smaller rebounds by the shutter 47 in the closure phase, and therefore better operating precision of the metering servovalve 5.

It is clear that other modifications and improvements can be made to the described alternatives of the injector 1 without leaving the scope of the invention. For example, the support for the calibrated segment 53 of the outlet channel 42 can have a different shape from those shown, and be fixed to the valve body 7 in a different manner, for example, via threaded elements.

Furthermore, the annular fuel inlet chamber 30 in the control chamber 26 can have a different shape and the seals between the tubular portion 8 and the hole 6, and between the flange 33 and the shoulder 35 can also be obtained with different means. In turn, the radial segments of the outlet passage 42 can be more than two and be arranged at equidistant angles.

Finally, the actuator 15 can be substituted by a piezoelectric actuator device.

The invention claimed is:

1. A fuel injector with a balanced metering servovalve, for an internal combustion engine, said servovalve controlling a control rod movable along an axial cavity for opening/closing an injection nozzle, said servovalve comprising:

a valve body integral with an axial guide stem and defining a control chamber axially delimited, on one side, by an end surface of said control rod and, on the other side, by a bottom surface of said control chamber, and radially delimited by a tubular portion of said valve body;

said valve body provided with a calibrated inlet and an outlet passage for fuel both in fluid communication with said control chamber;

said outlet passage comprising:

a) an axial segment starting from said bottom surface of said control chamber;

b) at least one substantially radial segment starting from said axial segment and exiting through a lateral surface of said axial guide stem; and c) a calibrated segment arranged at a distance from said substantially radial segment;

an electro-actuator;

a shutter carried by a sleeve controlled by said electro-actuator and coupled in a fluid-tight manner with said axial guide stem in order to axially slide between a closed position and an open position, respectively for closing and opening said substantially radial segment, to control the axial movement of said control rod;

said tubular portion and said axial guide stem formed as a single piece;

said valve body having a seat starting from said bottom surface and coaxial with said axial segment;

said calibrated segment arranged in an element separate from said valve body and housed in fixed position in said seat of said valve body.

2. The fuel injector according to claim 1, wherein said element is fixed in correspondence to said axial segment of said outlet passage.

3. The fuel injector according to claim 1, wherein said element is formed by a bushing inserted by force into said seat.

4. The fuel injector according to claim 1, wherein said element is formed by a bushing inserted by threading into said seat.

5. Injector according to claim 1, wherein said element is formed by a washer resting on said bottom wall.

6. Injector according to claim 5, wherein said washer is pushed against said bottom wall by a compression spring.

7. Injector according to claim 6, wherein said rod has a truncated-cone end surface, said spring having a truncated-cone shape engaging said end surface so as to keep said washer centred.

8. Injector according to claim 1, wherein said element is composed of a relatively thin plate containing said calibrated segment and housed in said first segment, said plate being constrained in its position by another element of relatively soft material, inserted by force inside said first axial segment.

9. The fuel injector according to claim 1, wherein said axial segment is associated with at least two substantially radial segments running into said axial segment in angularly equidistant positions.

10. Injector according to claim 9, wherein said axial segment comprises at least a first segment having a diameter at least eight times the diameter of said calibrated segment, said first segment being obtained in an intermediate portion of said valve body situated between said tubular portion and said stem.

11. Injector according to claim 10, wherein said axial segment is obtained inside said intermediate portion, said substantially radial segments being inclined to run into a position of said axial segment.

12. Injector according to claim 10, wherein said axial segments comprises a second segment having a smaller diameter than that of said first segment and arranged between said first segment and said substantially radial segments.

13. The fuel injector according to claim 1, wherein the diameter of the said axial guide stem is between 2.5 and 3.5 millimeters.

14. The fuel injector according to claim 13, wherein the diameter of said axial guide stem is equal to 2.5 millimeters.

15. The fuel injector according to claim 13, wherein said electro-actuator comprises a spring exerting an axial action of closure on said shutter, and wherein the ratio between the preloading of said spring and the diameter of a coupling zone between said shutter and said axial guide stem is between 8 and 12.

16. A fuel injector with a balanced metering servovalve, for an internal combustion engine, said servovalve controlling a control rod movable along an axial cavity for opening/closing an injection nozzle, said servovalve having a valve body comprising a control chamber delimited, axially, by said control rod and, radially, by a tubular portions of said valve body;

said control chamber having a calibrated inlet for fuel and an outlet passage comprising a calibrated segment, an axial segment and at least one substantially radial segment exiting through a lateral surface of said axial guide stem;

said calibrated segment arranged in correspondence to a bottom wall of said tubular portion such that said control chamber delimited by said bottom wall;

said valve body being integral with an axial guide stem for a shutter carried by a sleeve controlled by an electro-actuator;

said sleeve being coupled in a fluid-tight manner with said stem in order to axially slide between a closed position and an open position of said substantially radial segment to control the axial movement of said control rod;

said axial segment running into said bottom wall;

said calibrated segment arranged in said outlet passage at a distance from said shutter and carried by an element housed in said valve body;

said element being fixed in correspondence to said bottom wall;

said element formed by a bushing inserted by force or threading into a seat carried by said valve body and coaxial with said axial segment.

17. The fuel injector according to claim 16, wherein said element is fixed in correspondence to said axial segment of said outlet passage.

* * * * *